(12) United States Patent
Kitaguchi et al.

(10) Patent No.: US 8,932,985 B2
(45) Date of Patent: Jan. 13, 2015

(54) VINYL CHLORIDE-BASED RESIN LATEXES, PROCESSES FOR PRODUCING THE SAME, AND THERMAL TRANSFER IMAGE-RECEIVING SHEET OBTAINED USING THE SAME

(75) Inventors: Haruyasu Kitaguchi, Yamaguchi (JP); Shinichi Yoshida, Tokyo (JP)

(73) Assignee: Tosoh Corporation, Shunan-shi (JP)

( * ) Notice: Subject to any disclaimer, the term of this patent is extended or adjusted under 35 U.S.C. 154(b) by 50 days.

(21) Appl. No.: 13/514,776

(22) PCT Filed: Dec. 7, 2010

(86) PCT No.: PCT/JP2010/071870
§ 371 (c)(1),
(2), (4) Date: Jun. 8, 2012

(87) PCT Pub. No.: WO2011/071031
PCT Pub. Date: Jun. 16, 2011

(65) Prior Publication Data
US 2012/0244297 A1    Sep. 27, 2012

(30) Foreign Application Priority Data

Dec. 10, 2009  (JP) ................................ 2009-280712
Dec. 16, 2009  (JP) ................................ 2009-285463

(51) Int. Cl.
| | | |
|---|---|---|
| *B41M 5/52* | (2006.01) | |
| *C08F 2/16* | (2006.01) | |
| *C08F 14/06* | (2006.01) | |
| *C08F 214/06* | (2006.01) | |
| *C08F 218/08* | (2006.01) | |
| *C08F 220/32* | (2006.01) | |

(52) U.S. Cl.
CPC .............. *B41M 5/5254* (2013.01); *C08F 14/06* (2013.01); *C08F 214/06* (2013.01); *C08F 220/32* (2013.01); *C08F 2/16* (2013.01); *B41M 2205/02* (2013.01); *B41M 2205/06* (2013.01); *C08F 218/08* (2013.01)
USPC ............ 503/227; 526/204; 526/214; 526/273

(58) Field of Classification Search
CPC . B41M 5/5254; B41M 2205/02; C08F 14/06; C08F 2/16; C08F 214/06; C08F 218/08; C08F 220/32
USPC ......... 428/32.39; 503/227; 526/204, 214, 273
See application file for complete search history.

(56) References Cited

U.S. PATENT DOCUMENTS

| | | |
|---|---|---|
| 4,242,484 A | 12/1980 | Suzuki et al. |
| 4,440,897 A | 4/1984 | Maska |
| 5,731,368 A | 3/1998 | Stanley et al. |

FOREIGN PATENT DOCUMENTS

| | | |
|---|---|---|
| CA | 730748 A | 3/1966 |
| CN | 101274558 A | 10/2008 |
| DE | 1 769 003 | 6/1971 |
| GB | 773573 | 5/1957 |
| GB | 1 255 386 | 12/1971 |
| JP | 60-015471 A | 1/1985 |
| JP | 60-233103 A | 11/1985 |
| JP | 61 053367 | 3/1986 |
| JP | 62 209106 | 9/1987 |
| JP | 1-197503 A | 8/1989 |
| JP | 04 007308 | 1/1992 |
| JP | 5-004459 A | 1/1993 |
| JP | 5-004460 A | 1/1993 |
| JP | 5-064988 A | 3/1993 |
| JP | 5-246150 A | 9/1993 |
| JP | 06 234269 | 8/1994 |
| JP | 07 284644 | 10/1995 |
| JP | 08 100022 | 4/1996 |
| JP | 9 118728 | 5/1997 |
| JP | 9-263610 A | 10/1997 |
| JP | 11-115325 A | 4/1999 |
| JP | 11-124530 A | 5/1999 |
| JP | 11-511195 A | 9/1999 |
| JP | 2003 054142 | 2/2003 |
| JP | 2010 031234 | 2/2010 |

OTHER PUBLICATIONS

Laaksonen, J. et al., "Mechanism of Emulsifier-free Emulsion Polymerization of Vinyl Chloride", Plastics and Rubber Materials and Applications, vol. 5, No. 1, pp. 21-24, (Feb. 1980).
International Search Report issued Mar. 1, 2011 in PCT/JP2010/071870 Filed Dec. 7, 2010.
Japanese Office Action dated Jun. 18, 2013, in Japanese Patent Application No. 2009-100006.
Japanese Office Action dated Dec. 24, 2013, in Japanese Patent Application No. 2009-280712.
Extended European Search Report Issued May 13, 2013 in Patent Application No. 10835951.4.
Office Action issued Mar. 18, 2014 in Japanese Patent Application No. 2009-285463 (with English translation).
Combined Office Action and search Report issued Apr. 2, 2014 in Chinese Patent Application No. 201080056216.X (with English translation and English translation of Category of Cited Documents).

*Primary Examiner* — Bruce H Hess
(74) *Attorney, Agent, or Firm* — Oblon, Spivak, McClelland, Maier & Neustadt, L.L.P.

(57) ABSTRACT

A vinyl chloride-based resin latex which froths little when unreacted monomer remaining in the latex are recovered under heat and reduced-pressure conditions, and a thermal transfer image-receiving sheet which has satisfactory water resistance, does not yellow during storage, and gives images having excellent durability and light resistance. The invention provides a vinyl chloride-based resin latex contains a copolymer containing a vinyl chloride and an epoxy-group-containing vinyl or contains vinyl chloride, an epoxy-group-containing vinyl, and a carboxylic acid vinyl ester, wherein a content of the epoxy-group-containing vinyl is 0.1% by weight or more but less than 3% by weight, and wherein the latex contains no surfactant, and has a solid concentration of 25% by weight or more; a process for producing the latex; and a thermal transfer image-receiving sheet obtained using the latex.

17 Claims, No Drawings

VINYL CHLORIDE-BASED RESIN LATEXES, PROCESSES FOR PRODUCING THE SAME, AND THERMAL TRANSFER IMAGE-RECEIVING SHEET OBTAINED USING THE SAME

TECHNICAL FIELD

The present invention relates to vinyl chloride-based resin latexes containing no surfactant, processes for producing the latexes, and a thermal transfer image-receiving sheet obtained using the same. The invention further relates to vinyl chloride-based resins which contain no surfactant.

BACKGROUND ART

In general, a vinyl chloride-based resin latex is obtained by feeding either a vinyl chloride monomer or a monomer mixture composed of a vinyl chloride monomer and one or more monomers copolymerizable therewith to a polymerizer, polymerizing the monomer(s) in an aqueous medium in the presence of a surfactant and a polymerization initiator, causing the polymerization reaction to proceed while keeping the internal temperature of the polymerizer at a given temperature, and terminating the polymerization reaction after the amount of the fed monomer(s) remaining unreacted decreases with increasing conversion into polymer and the internal pressure of the polymerizer has begun to decrease and at the time when the internal pressure of the polymerizer has become a value corresponding to a desired conversion into polymer. Consequently, the vinyl chloride-based resin obtained by drying the vinyl chloride-based resin latex contains the surfactant. Although there are the cases where the surfactant is removed, for example, by washing the vinyl chloride-based resin with water, it has been difficult to sufficiently remove the surfactant. It is known that products produced using resins containing a surfactant in a large amount generally are poor in water resistance and adhesiveness as compared with products produced using resins having a low surfactant content. Furthermore, since unreacted monomers generally remain in vinyl chloride latexes, the unreacted monomers are recovered under heat and reduced-pressure conditions. This operation has had encountered a problem that when the latexes contain a surfactant, considerable frothing occurs to impair the efficiency of this latex treatment.

Some proposals hence have been made on a vinyl chloride-based resin in which the amount of the surfactant remaining therein has been minimized (patent document 1 and non-patent document 1).

In patent document 1, a reactive emulsifying agent having a polymerizable double bond which is capable of chemically combining with the main chain of a resin has been proposed for the purpose of preventing liberation from the resin. In non-patent document 1, soap-free polymerization in which a surfactant is not used at all has been proposed.

However, the reactive emulsifying agent proposed in patent document 1 has had a problem that this emulsifying agent does not wholly combine chemically with a resin and part of the reactive emulsifying agent is still present in the state of having been liberated from the resin. Meanwhile, the technique proposed in non-patent document 1 is mere soap-free polymerization in which although a surfactant is not used at all, the latex is regulated so as to have a solid concentration of 20% or less because polymerization of a vinyl chloride monomer added in an increased amount results in latex coagulation in the course of the polymerization. This technique, when used for actual production, has poor productivity because of the low solid concentration, and has posed a problem because of enhanced scale generation. It is thought that for obtaining a vinyl chloride-based resin latex having a high solid concentration by soap-free polymerization, use may be made of a method in which a vinyl monomer that has a hydrophilic group and is copolymerizable with vinyl chloride is copolymerized with vinyl chloride. Examples of the vinyl monomer having a hydrophilic group and having high copolymerizability with a vinyl chloride monomer are substantially limited to vinyl acetate. Most of the vinyl chloride copolymers which are being produced at present are copolymers of vinyl chloride and vinyl acetate. However, when a monomer mixture composed of vinyl chloride and vinyl acetate is polymerized in the absence of a surfactant, there has been a problem that latex coagulation occurs in the course of the polymerization. Consequently, no vinyl chloride-based resin latex having a high solid concentration and containing no surfactant has been developed.

With respect to vinyl chloride-based copolymers produced from vinyl chloride and a vinyl compound other than vinyl acetate, vinyl chloride-based copolymers produced from vinyl chloride and glycidyl methacrylate are described in patent document 2 and patent document 3.

However, patent document 2 describes a vinyl chloride-based resin containing sodium lauryl sulfate, which is a surfactant. In patent document 3, a vinyl chloride-based polymer containing a polyalkylene glycol, which is a surfactant, is described in the Examples thereof. Namely, each of the vinyl chloride-based resins described in patent document 2 and patent document 3 contains a surfactant. Consequently, neither a vinyl chloride-based resin latex which has a solid concentration of 25% by weight or higher and contains none of those surfactant ingredients nor a process for producing the latex has been developed so far.

Meanwhile, formation of characters or images on a receiving object using a thermal transfer technique has been conducted hitherto. Widely used as the thermal transfer technique are a thermal sublimation type transfer technique and a thermal melting type transfer technique. The thermal sublimation type transfer technique, of these, is a technique in which a sublimable dye is used as a colorant and the dye contained in the sublimable-dye layer disposed on a thermal transfer sheet is transferred to a receiving object, e.g., a thermal transfer image-receiving sheet, by means of a heating device, e.g., a thermal head or a light-emitting laser device, that is controlled so as to generate heat in accordance with image information. In this thermal sublimation type transfer technique, the amount of the dye to be transferred can be regulated with respect to each dot by means of heating conducted in an extremely short period. The image thus formed is exceedingly clear and highly transparent because the colorant used is a dye. The image obtained hence is excellent in terms of half-tone reproducibility and gradation, and exceedingly high-resolution images can be obtained. It is therefore possible to obtain high-quality images comparable to full-color silver-salt photographs. In addition, compared to the ordinary technique of forming silver-salt photographic images, this thermal sublimation type transfer technique has many advantages, for example, that this technique is a dry process, visible images can be obtained directly from digital data, and duplication is easy.

In general, a thermal transfer image-receiving sheet includes at least a support and, formed thereover, a dye-receiving layer (receiving layer) and a heat-insulating layer. As a resin for forming the receiving layer, a vinyl chloride-based resin is being used because this resin is excellent in terms of dyeability and releasability and does not cause abnormal transfer, e.g., fusion bonding, between the thermal transfer sheet and the thermal transfer image-receiving sheet during thermal transfer.

The image transferred to a thermal transfer image-receiving sheet is required to be kept fixed stably over a long period. However, the image transferred to the receiving sheet described above discolors or fades by the action of indoor light or sunlight or as a result of adhesion of greasy matter such as fingerprints. An improvement in image durability hence is desired.

Use of a water-soluble resin or a water-dispersible resin as a resin for receiving-layer formation has been proposed in order to improve image durability. For example, an aqueous dispersion of a polyester resin has been disclosed (patent document 4).

In this case, however, the image has insufficiently improved light resistance although improved in durability in terms of resistance to oily matter.

A proposal hence has been made on addition of a water-dispersible ultraviolet absorber to a water-based coating fluid for receiving-layer formation, and benzotriazole-based and benzophenone-based compounds are shown as examples of the ultraviolet absorber. However, such organic compounds having ultraviolet-absorbing ability have a relatively low molecular weight and hence are unstable, and there have been the cases where the receiving sheet in the unprinted state yellows when stored over a long period. A proposal has hence been made on addition of a water-soluble polymeric ultraviolet absorber (patent document 5).

However, there has been a problem that when such a high-molecular ultraviolet absorber is added in a large amount in order to sufficiently improve light resistance, the result is a decrease in water resistance.

PRIOR-ART DOCUMENTS

Patent Documents

Patent Document 1: JP-A-7-284644
Patent Document 2: JP-A-61-53367
Patent Document 3: JP-A-9-118728
Patent Document 4: JP-A-6-234269
Patent Document 5: JP-A-2003-54142

Non-Patent Document

Non-Patent Document 1: Plastics and Rubber: Materials and Applications (1980), 5(1), pp. 21-24

SUMMARY OF THE INVENTION

Problems that the Invention is to Solve

An object of the invention, which has been achieved in view of the problems described above, is to provide vinyl chloride-based resin latexes which contain no surfactant and which froth little when the unreacted monomers remaining in the latexes are recovered under heat and reduced-pressure conditions, processes for producing the latexes, vinyl chloride-based resins which contain no surfactant, and a thermal transfer image-receiving sheet which has satisfactory water resistance, does not yellow during storage, and gives images having excellent durability and light resistance.

Means for Solving the Problems

Namely, essential points of the invention reside in the following (1) to (15).

(1) A vinyl chloride-based resin latex that contains a copolymer which includes vinyl chloride and an epoxy-group-containing vinyl and in which the content of the epoxy-group-containing vinyl is 0.1% by weight or more but less than 3% by weight, characterized by containing no surfactant and having a solid concentration of 25% by weight or more.

(2) A vinyl chloride-based resin latex that contains a copolymer which includes vinyl chloride, an epoxy-group-containing vinyl, and a carboxylic acid vinyl ester and in which the content of the epoxy-group-containing vinyl is 0.1% by weight or more but less than 3% by weight, characterized by containing no surfactant and having a solid concentration of 25% by weight or more.

(3) The vinyl chloride-based resin latex according to (2) preferably characterized in that the carboxylic acid vinyl ester is vinyl acetate.

(4) The vinyl chloride-based resin latex according to any one of (1) to (3) preferably characterized in that the epoxy-group-containing vinyl is glycidyl methacrylate or allyl glycidyl ether.

(5) A process for producing the vinyl chloride-based resin latex according to (1) or (4) which comprises polymerizing a vinyl chloride monomer and an epoxy-group-containing vinyl monomer in the presence of a polymerization initiator in an aqueous medium containing no surfactant, the amount of the epoxy-group-containing vinyl monomer being 0.1% by weight or more but less than 3% by weight based on the sum of the vinyl chloride monomer and the epoxy-group-containing vinyl monomer, the process being characterized in that the weight ratio of the vinyl chloride monomer and the epoxy-group-containing vinyl monomer to the water is ⅓ or greater and that part or the whole of the epoxy-group-containing vinyl monomer is added in portions or continuously to the aqueous medium during the polymerization.

(6) A process for producing the vinyl chloride-based resin latex according to any one of (2) to (4) which comprises polymerizing a vinyl chloride monomer, an epoxy-group-containing vinyl monomer, and a carboxylic acid vinyl ester monomer in the presence of a polymerization initiator in an aqueous medium containing no surfactant, the amount of the epoxy-group-containing vinyl monomer being 0.1% by weight or more but less than 3% by weight based on the sum of the vinyl chloride monomer, the epoxy-group-containing vinyl monomer, and the carboxylic acid vinyl ester monomer, the process being characterized in that the weight ratio of the vinyl chloride monomer, the epoxy-group-containing vinyl monomer, and the carboxylic acid vinyl ester monomer to the water is ⅓ or greater and that part or the whole of the epoxy-group-containing vinyl monomer is added in portions or continuously to the aqueous medium during the polymerization.

(7) The process for vinyl chloride-based resin latex production according to (5) or (6) preferably characterized in that part of the vinyl chloride monomer is added in portions or continuously to the aqueous medium during the polymerization.

(8) The process for vinyl chloride-based resin latex production according to any one of (5) to (7) preferably characterized in that the monomers are polymerized in the presence of a chain transfer agent or a reducing agent or both.

(9) A vinyl chloride-based resin latex composition characterized by containing the vinyl chloride-based resin latex according to any one of (1) to (4).

(10) A vinyl chloride-based resin powder characterized by being obtained from the vinyl chloride-based resin latex according to any one of (1) to (4).

(11) A vinyl chloride-based resin composition characterized by including the vinyl chloride-based resin powder according to (10) and an organic solvent.
(12) A thermal transfer image-receiving sheet which includes a support and, disposed thereover, a heat-insulating layer and a receiving layer, characterized in that the receiving layer contains a vinyl chloride-based resin and 0.1-3 parts by weight of an epoxy-group-containing vinyl per 100 parts by weight of the vinyl chloride-based resin and contains no surfactant, and that the vinyl chloride-based resin has been formed using a vinyl chloride-based resin latex obtained by emulsion-polymerizing a vinyl chloride monomer and an epoxy-group-containing vinyl monomer in an aqueous medium containing no surfactant, the amount of the epoxy-group-containing vinyl monomer being 0.1% by weight or more based on the sum of the vinyl chloride monomer and the epoxy-group-containing vinyl monomer.
(13) The thermal transfer image-receiving sheet according to (12) preferably characterized in that a carboxylic acid vinyl ester monomer is contained besides the vinyl chloride monomer and the epoxy-group-containing vinyl monomer.
(14) The thermal transfer image-receiving sheet according to (13) preferably characterized in that the carboxylic acid vinyl ester monomer is vinyl acetate.
(15) The thermal transfer image-receiving sheet according to any one of (12) to (14) preferably characterized in that the epoxy-group-containing vinyl is glycidyl methacrylate or allyl glycidyl ether.

The present inventors diligently made investigations on the problems described above. As a result, the inventors have found that when polymerization is conducted in a specific manner, the polymerization proceeds stably and a vinyl chloride-based resin latex having a solid concentration of 25% by weight or more is obtained, and that a thermal transfer image-receiving sheet which has a receiving layer formed using the vinyl chloride-based resin latex has satisfactory water resistance, does not yellow during storage, and gives images having excellent durability and light resistance. Specifically, the invention relates to: vinyl chloride-based resin latexes containing a copolymer which is either a copolymer including vinyl chloride and an epoxy-group-containing vinyl or a copolymer including vinyl chloride, an epoxy-group-containing vinyl, and a carboxylic acid vinyl ester and in which the content of the epoxy-group-containing vinyl is 0.1% by weight or more but less than 3% by weight, the vinyl chloride-based resin latexes being characterized by containing no surfactant and having a solid concentration of 25% by weight or more; processes for producing the latexes; and a thermal transfer image-receiving sheet obtained using the latexes.

Effects of the Invention

The vinyl chloride-based resin latexes of the invention have an advantage that since the latexes contain no surfactant, the latexes are inhibited from frothing when unreacted monomers are recovered from the latexes, thereby enabling the recovery step to be conducted efficiently. The thermal transfer image-receiving sheet of the invention has an advantage that the image receiving sheet has satisfactory water resistance, does not yellow during storage, and gives images having excellent durability and light resistance.

MODES FOR CARRYING OUT THE INVENTION

The invention is explained below in detail.
One of the vinyl chloride-based resin latexes of the invention contains a copolymer which includes vinyl chloride and an epoxy-group-containing vinyl and in which the content of the epoxy-group-containing vinyl is 0.1% by weight or more but less than 3% by weight. Since this latex contains the copolymer of vinyl chloride and an epoxy-group-containing vinyl, a film obtained by applying and drying the latex has excellent thermal stability. Examples of the epoxy-group-containing vinyl include: glycidyl esters of (meth)acrylic acid, such as glycidyl methacrylate, glycidyl acrylate, glycidyl β-methylmethacrylate, and glycidyl β-methylacrylate; and the diglycidyl esters of vinyl-polymerizable unsaturated carboxylic acids such as maleic acid, fumaric acid, and itaconic acid.

The other vinyl chloride-based resin latex of the invention contains a copolymer which includes vinyl chloride, an epoxy-group-containing vinyl, and a carboxylic acid vinyl ester and in which the content of the epoxy-group-containing vinyl is 0.1% by weight or more but less than 3% by weight. Since this latex contains the copolymer of vinyl chloride, an epoxy-group-containing vinyl, and a carboxylic acid vinyl ester, the polymer can be made to have hydroxyl groups by subjecting the carboxylic acid vinyl ester to saponification reaction. Examples of the carboxylic acid vinyl ester include vinyl acetate, vinyl propionate, vinyl myristate, and vinyl benzoate.

The vinyl chloride-based resin latexes of the invention each are a latex in which the copolymer contained therein has a content of the epoxy-group-containing vinyl of 0.1% by weight or more but less than 3% by weight. In the case where the content of the epoxy-group-containing vinyl is less than 0.1% by weight, this latex cannot be a latex which has a solid concentration of 25% by weight or more and which contains no surfactant.

The vinyl chloride-based resin latexes of the invention contain no surfactant. The term "surfactant" herein means a substance which, when used in a small amount, shows remarkable surface activity (the function of dissolving in water and reducing the surface tension of the water), and examples thereof include anionic surfactants, nonionic surfactants, cationic surfactants, and amphoteric surfactants. Examples thereof include: anionic surfactants including sulfuric acid alkyl ester salts such as sodium lauryl sulfate and myristyl sulfate, alkylbenzenesulfonic acid salts such as sodium dodecylbenzenesulfonate and potassium dodecylbenzenesulfonate, sulfosuccinic acid salts such as sodium dioctyl sulfosuccinate and sodium dihexyl sulfosuccinate, fatty acid salts such as ammonium laurate and potassium stearate, sulfuric acid polyoxyethylene alkyl ester salts, and sulfuric acid polyoxyethylene alkylaryl ester salts; nonionic surfactants including sorbitan esters such as sorbitan monooleate and polyoxyethylene sorbitan monostearate, polyoxyethylene alkylphenyl ethers, polyoxyethylene alkyl esters, polyalkylene glycols, poly(vinyl alcohol), partly saponified poly(vinyl alcohol), partly saponified poly(methyl methacrylate), poly(acrylic acid), and salts thereof; cationic surfactants such as stearylamine acetate and lauryltrimethylammonium chloride; and amphoteric surfactants such as lauryldimethylamine oxide and laurylcarboxymethylhydroxyethylimidazolium betaine.

The vinyl chloride-based resin latexes of the invention can contain a chain transfer agent, a reducing agent, a buffer, etc. The chain transfer agent, reducing agent, buffer, etc. may be added, when the vinyl chloride-based resin latexes of the invention are produced, for the purpose of stabilizing the polymerization or reducing scale generation. The chain transfer agent is not limited so long as the degree of polymerization of the vinyl chloride-based polymer can be regulated therewith. Examples thereof include: halogenated hydrocarbons such as trichloroethylene and carbon tetrachloride; mercaptans such as 2-mercaptoethanol, octyl 3-mercaptopropionate, and dodecyl mercaptan; and acetone and aldehydes such as n-butyraldehyde. Examples of the reducing agent include sodium sulfite, ammonium sulfite, sodium hydrogen sulfite, ammonium hydrogen sulfite, ammonium thiosulfate, potassium metabisulfite, sodium dithionite, sodium formaldehydesulfoxylate, L-ascorbic acid, dextrose, ferrous sulfate, and copper sulfate.

The vinyl chloride-based resin latexes of the invention have a solid concentration of 25% by weight or more. In the case where a vinyl chloride-based resin latex has a solid concentration less than 25% by weight, a large amount of water must be removed when this latex is spray-dried to obtain a vinyl chloride-based resin, resulting in impaired productivity.

The vinyl chloride-based resin latexes of the invention can be produced by polymerizing a vinyl chloride monomer and an epoxy-group-containing vinyl monomer or polymerizing a vinyl chloride monomer, an epoxy-group-containing vinyl monomer, and a carboxylic acid vinyl ester monomer. It is, however, necessary for this polymerization that the epoxy-group-containing vinyl monomer should be used in an amount of 0.1% by weight or more but less than 3% by weight based on all monomers, that all the monomers should be polymerized in the presence of a polymerization initiator in an aqueous medium containing no surfactant, that the weight ratio of all monomers to the water should be ⅓ or greater, and that part or the whole of the epoxy-group-containing vinyl monomer should be added in portions or continuously to the aqueous medium during the polymerization. In the case where the monomers used include an epoxy-group-containing vinyl monomer in an amount less than 0.1% by weight based on all the monomers, it is necessary to add a surfactant in order to ensure polymerization stability and the resultant latex froths considerably when the unreacted monomers remaining in the latex are recovered under heat and reduced-pressure conditions. Furthermore, in the case where the weight ratio of all monomers to the water is less than ⅓, the resultant latex has a solid concentration of 25% by weight or less and, hence, a large amount of water must be removed when this latex is spray-dried to obtain a vinyl chloride-based resin, resulting in impaired productivity.

By adding part or the whole of the epoxy-group-containing vinyl monomer in portions or continuously to the aqueous medium during the polymerization, the polymerization is rendered stable even when the proportion of the epoxy-group-containing vinyl in all monomers is small. In addition, this method of addition is preferred because the cost of the vinyl chloride-based resin latex decreases as the proportion of the epoxy-group-containing vinyl in all monomers becomes smaller. To add part of the epoxy-group-containing vinyl monomer in portions or continuously to the aqueous medium to conduct polymerization means that part of the epoxy-group-containing vinyl monomer is added to the aqueous medium before initiation of polymerization to initiate the polymerization and all the remainder of the epoxy-group-containing vinyl monomer is added in portions or continuously to the aqueous medium when the polymerization is being conducted. In the case where the concentration of the epoxy-group-containing vinyl monomer in the aqueous medium is high during the polymerization, the vinyl chloride-based resin obtained by drying the resultant vinyl chloride-based resin latex tends to have impaired solubility in organic solvents, e.g., methyl ethyl ketone. It is therefore preferred that the epoxy-group-containing vinyl monomer content should be added little by little in portions or continuously in the presence of the vinyl chloride monomer.

It is also preferred that part of the vinyl chloride monomer should be added in portions or continuously to the aqueous medium during the polymerization, because this method of addition shortens the polymerization period.

Examples of polymerization methods usable in the invention include a method in which given monomers are polymerized at a temperature of 30-80° C., for example, by soap-free polymerization in which the monomers are polymerized in the presence of a polymerization initiator in an aqueous medium containing no surfactant or by soap-free seed emulsion polymerization in which particles obtained by the soap-free polymerization are used as seeds to conduct polymerization, thereby obtaining a vinyl chloride-based resin latex.

The polymerization need not be conducted in the presence of a chain transfer agent or a reducing agent or both. However, by conducting the polymerization in the presence of a chain transfer agent or a reducing agent or both, the polymerization is stabilized and scale generation is reduced, as stated above. In addition, since the addition of a reducing agent contributes to initiator decomposition due to a redox system, the amount of the undecomposed initiator remaining in the latex after termination of the polymerization can be reduced.

The chain transfer agent is not limited so long as the degree of polymerization of the vinyl chloride-based polymer can be regulated therewith. Examples thereof include: halogenated hydrocarbons such as trichloroethylene and carbon tetrachloride; mercaptans such as 2-mercaptoethanol, octyl 3-mercaptopropionate, and dodecyl mercaptan; and acetone and aldehydes such as n-butyraldehyde.

Examples of the reducing agent include sodium sulfite, ammonium sulfite, sodium hydrogen sulfite, ammonium hydrogen sulfite, ammonium thiosulfate, potassium metabisulfite, sodium dithionite, sodium formaldehydesulfoxylate, L-ascorbic acid, dextrose, ferrous sulfate, and copper sulfate.

Examples of the epoxy-group-containing vinyl monomer include: glycidyl esters of (meth)acrylic acid, such as glycidyl methacrylate, glycidyl acrylate, glycidyl β-methylmethacrylate, and glycidyl β-methylacrylate; and the diglycidyl esters of vinyl-polymerizable unsaturated carboxylic acids such as maleic acid, fumaric acid, and itaconic acid. These compounds can be used alone, or any desired combination of two or more thereof can be used.

Examples of the carboxylic acid vinyl ester monomer include vinyl acetate, vinyl propionate, vinyl myristate, and vinyl benzoate. These compounds can be used alone, or any desired combination of two or more thereof can be used.

Other monomers copolymerizable with vinyl chloride can be included in those monomers according to need. Examples of the other monomers copolymerizable with vinyl chloride include the following monomers: unsaturated carboxylic acids such as acrylic acid, methacrylic acid, maleic acid, and fumaric acid or the anhydrides thereof; esters of acrylic acid, such as the methyl, ethyl, and butyl esters; esters of methacrylic acid, such as the methyl, ethyl, and butyl esters; esters of unsaturated carboxylic acids, such as maleic acid esters, fumaric acid esters, and cinnamic acid esters; vinyl ethers such as vinyl methyl ether, vinyl amyl ether, and vinyl phenyl ether; monoolefins such as ethylene, propylene, butene, and pentene; vinylidene chloride; styrene and derivatives thereof; acrylonitrile; and methacrylonitrile. These monomers can be used alone, or any desired combination of two or more thereof can be used.

Examples of the polymerization initiator to be used in the invention include water-soluble initiators such as potassium persulfate and ammonium persulfate and oil-soluble initiators such as azo compounds represented by azobisisobutyronitrile, lauroyl peroxide, and t-butyl peroxypivalate, diacyl peroxides, peroxyesters, and peroxydicarbonates. These initiators can be used alone or in combination of two or more thereof.

The aqueous medium to be used in the invention is a medium which includes water and a water-soluble polymerization aid (e.g., a buffer) and in which organic layers including a vinyl chloride monomer are to be dispersed.

Examples of surfactants, which are not used in the invention, include: anionic surfactants including sulfuric acid alkyl ester salts such as sodium lauryl sulfate and myristyl sulfate, alkylbenzenesulfonic acid salts such as sodium dodecylbenzenesulfonate and potassium dodecylbenzenesulfonate, sulfosuccinic acid salts such as sodium dioctyl sulfosuccinate and sodium dihexyl sulfosuccinate, fatty acid salts such as ammonium laurate and potassium stearate, sulfuric acid polyoxyethylene alkyl ester salts, and sulfuric acid polyoxyethylene alkylaryl ester salts; and nonionic surfactants including sorbitan esters such as sorbitan monooleate and polyoxyethylene sorbitan monostearate, polyoxyethylene alkylphenyl ethers, polyoxyethylene alkyl esters, polyalkylene glycols, poly(vinyl alcohol), partly saponified poly(vinyl alcohol), partly saponified poly(methyl methacrylate), poly(acrylic acid), and salts thereof.

By incorporating various additives into a vinyl chloride-based resin latex of the invention, a vinyl chloride-based resin latex composition can be obtained. Examples of the additives include water, pigments, dyes, surfactants, tackifier resins, metal oxides, thickeners, fillers, film-forming aids, ultraviolet absorbers, antioxidants, plasticizers, vulcanizing agents, vulcanization accelerators, antifoamers, and alkoxysilane compounds.

For obtaining a vinyl chloride-based resin powder from the vinyl chloride-based resin latexes, any method may be used. For example, methods based on spray drying, fluidized drying, or the like are preferred, and methods based on spray drying are more preferred. For the spray drying, dryers in general use may be employed. Examples thereof include the various spray dryers described in *SPRAY DAYING HANDBOOK* (written by K. Masters, 3rd edition, 1979, published from George godwin Limited), p. 121, Fig. 4.10 (for example, a standard chamber and a tall-form nozzle chamber).

By dissolving the vinyl chloride-based resin powder of the invention in an organic solvent, a vinyl chloride-based resin composition can be obtained. In this case, various additives can be incorporated into this vinyl chloride-based resin composition. Examples of the organic solvent include alcohols such as methanol, ethanol, propanol, and butanol, alcohol ethers such as ethylene glycol monoethyl ether and ethylene glycol monobutyl ether, ketones such as acetone and methyl ethyl ketone, ethers such as tetrahydrofuran and dioxane, and hydrophobic organic solvents such as toluene, xylene, ethyl acetate, and butyl acetate. Examples of the additives include pigments, dyes, surfactants, tackifier resins, metal oxides, thickeners, fillers, film-forming aids, ultraviolet absorbers, antioxidants, plasticizers, vulcanizing agents, vulcanization accelerators, antifoamers, and alkoxysilane compounds.

Examples of applications of the vinyl chloride-based resin latexes, vinyl chloride-based resin latex composition, vinyl chloride-based resins, and vinyl chloride-based resin composition described above include coating, adhesives, sealants, inks, coating compositions, heat sealing, magnetic tapes, and paper for thermal transfer recording.

The thermal transfer image-receiving sheet of the invention, among those applications, includes a support and, disposed thereover, a heat-insulating layer and a receiving layer, and the receiving layer contains a vinyl chloride-based resin and 0.1-3 parts by weight of an epoxy-group-containing vinyl per 100 parts by weight of the vinyl chloride-based resin and contains no surfactant.

It is preferred that the thermal transfer image-receiving sheet of the invention should have an undercoat layer formed between the receiving layer and the support, from the standpoint of regulating the gloss, antistatic properties, etc. of the thermal transfer image-receiving sheet. It is preferred to form an undercoat layer, a heat-insulating layer, and a receiving layer in this order on a support.

(Receiving Layer)

The receiving layer has the function of receiving the dye which is transferred from an ink sheet and maintaining the image thus formed. The receiving layer at least contains a vinyl chloride-based resin capable of receiving the dye.

The receiving layer contains an epoxy-group-containing vinyl in an amount of 0.1-3 parts by weight per 100 parts by weight of the vinyl chloride-based resin. In the case where the amount of the epoxy-group-containing vinyl monomer is less than 0.1 part by weight, the receiving layer cannot be a receiving layer which contains no surfactant. In the case where the amount thereof exceeds 3 parts by weight, the thermal transfer image-receiving sheet has impaired surface smoothness.

Examples of the epoxy-group-containing vinyl include: glycidyl esters of (meth)acrylic acid, such as glycidyl methacrylate, glycidyl acrylate, glycidyl β-methylmethacrylate, and glycidyl β-methylacrylate; and the diglycidyl esters of vinyl-polymerizable unsaturated carboxylic acids such as maleic acid, fumaric acid, and itaconic acid. These compounds may be contained alone or in any desired combination of two or more thereof.

The receiving layer contains no surfactant. By employing the receiving layer which contains no surfactant, the thermal transfer image-receiving sheet obtained can be made to have improved water resistance.

Surfactants, which are not contained in the receiving layer, include anionic surfactants, nonionic surfactants, cationic surfactants, and amphoteric surfactants. Examples thereof include: anionic surfactants including sulfuric acid alkyl ester salts such as sodium lauryl sulfate and myristyl sulfate, alkylbenzenesulfonic acid salts such as sodium dodecylbenzenesulfonate and potassium dodecylbenzenesulfonate, sulfosuccinic acid salts such as sodium dioctyl sulfosuccinate and sodium dihexyl sulfosuccinate, fatty acid salts such as ammonium laurate and potassium stearate, sulfuric acid polyoxyethylene alkyl ester salts, and sulfuric acid polyoxyethylene alkylaryl ester salts; nonionic surfactants including sorbitan esters such as sorbitan monooleate and polyoxyethylene sorbitan monostearate, polyoxyethylene alkylphenyl ethers, polyoxyethylene alkyl esters, polyalkylene glycols, poly(vinyl alcohol), partly saponified poly(vinyl alcohol), partly saponified poly(methyl methacrylate), poly(acrylic acid), and salts thereof cationic surfactants such as stearylamine acetate and lauryltrimethylammonium chloride; and amphoteric surfactants such as lauryldimethylamine oxide and laurylcarboxymethylhydroxyethylimidazolium betaine.

The receiving layer can contain, for example, a polymer latex, a water-soluble polymer, a release agent, and the like, besides the vinyl chloride-based resin and the epoxy-group-containing vinyl, according to purposes.

A polymer latex can be incorporated into the receiving layer in order to regulate the elastic modulus of the film. Examples of the polymer latex include acrylic polymers, polyesters, rubbers (e.g., SBR resins), polyurethanes, poly(vinyl acetate) copolymers, and polyolefins.

A water-soluble polymer can be incorporated into the receiving layer because the water-soluble polymer prevents the dye with which the receiving layer has been dyed from diffusing and thereby enables formation of transferred recorded images which change little with the lapse of time. Examples of the water-soluble polymer include poly(vinyl alcohol)s and gelatin. Preferred of these is gelatin.

A release agent can be incorporated into the receiving layer in order to prevent thermal fusion bonding from occurring between the thermal transfer receiving sheet and the thermal transfer sheet during image formation. As the release agent, various wax dispersions can be used. As the wax dispersions, use can be made of known dispersions. Examples of preferred compounds include montan wax, derivatives thereof, and microcrystalline waxes.

(Vinyl Chloride-based Resin Latex)

A vinyl chloride-based resin latex is used for forming the receiving layer. This latex contains a vinyl chloride-based resin and 0.1-3 parts by weight of an epoxy-group-containing vinyl per 100 parts by weight of the vinyl chloride-based resin and contains no surfactant. In the case where the content of the epoxy-group-containing vinyl is less than 0.1 part by weight, this latex cannot be obtained through soap-free emulsion polymerization. In the case where the content thereof exceeds 3 parts by weight, this latex gives a thermal transfer image-receiving sheet having impaired surface smoothness.

The vinyl chloride-based resin latex can be produced by emulsion-polymerizing a vinyl chloride monomer and an epoxy-group-containing vinyl monomer in an aqueous medium containing no surfactant, the amount of the epoxy-group-containing vinyl monomer being 0.1% by weight or more based on the sum of the vinyl chloride monomer and the epoxy-group-containing vinyl monomer. It is possible to use a blend of two or more such vinyl chloride-based resin latexes.

For the emulsion polymerization, either water or a mixed solvent composed of water and a water-miscible organic solvent (e.g., methanol, ethanol, or acetone) is used as a dispersion medium. A mixture which includes a vinyl chloride monomer and an epoxy-group-containing vinyl monomer and in which the amount of the epoxy-group-containing vinyl monomer is 0.1% by weight or more based on the sum of the vinyl chloride monomer and the epoxy-group-containing vinyl monomer is polymerized in the aqueous medium containing no surfactant, the amount of the mixture being 5-150% by weight based on the dispersion medium. This polymerization may be conducted with stirring at about 30-100° C., preferably 60-90° C., for 3-24 hours using a polymerization initiator.

Examples of the epoxy-group-containing vinyl monomer include: glycidyl esters of (meth)acrylic acid, such as glycidyl methacrylate, glycidyl acrylate, glycidyl β-methylmethacrylate, and glycidyl β-methylacrylate; and the diglycidyl esters of vinyl-polymerizable unsaturated carboxylic acids such as maleic acid, fumaric acid, and itaconic acid. These compounds can be used alone, or any desired combination of two or more thereof can be used.

In the case where the amount of the epoxy-group-containing vinyl monomer is less than 0.1% by weight based on the sum of the vinyl chloride monomer and the epoxy-group-containing vinyl monomer, the emulsion polymerization is unstable and the vinyl chloride-based resin latex is not obtained. Even when the monomer mixture contains no epoxy-group-containing vinyl monomer, the polymerization can be made to proceed stably to yield a latex by reducing the weight ratio of the vinyl chloride monomer and the epoxy-group-containing vinyl monomer to the dispersion medium. However, the resultant latex has a low solid concentration and, hence, is unsuitable for use as a coating fluid for receiving-layer formation.

The vinyl chloride monomer and the epoxy-group-containing vinyl monomer can contain a carboxylic acid vinyl ester monomer besides these.

Examples of the carboxylic acid vinyl ester monomer include vinyl acetate, vinyl propionate, vinyl myristate, and vinyl benzoate. These compounds can be used alone, or any desired combination of two or more thereof can be used.

Monomers copolymerizable with vinyl chloride can be included in those monomers according to need. Examples of the monomers copolymerizable with vinyl chloride include the following monomers: unsaturated carboxylic acids such as acrylic acid, methacrylic acid, maleic acid, and fumaric acid or the anhydrides thereof; esters of acrylic acid, such as the methyl, ethyl, and butyl esters; esters of methacrylic acid, such as the methyl, ethyl, and butyl esters; esters of unsaturated carboxylic acids, such as maleic acid esters, fumaric acid esters, and cinnamic acid esters; vinyl ethers such as vinyl methyl ether, vinyl amyl ether, and vinyl phenyl ether; monoolefins such as ethylene, propylene, butene, and pentene; vinylidene chloride; styrene and derivatives thereof; acrylonitrile; and methacrylonitrile. These monomers can be used alone, or any desired combination of two or more thereof can be used.

Examples of the polymerization initiator include water-soluble initiators such as potassium persulfate and ammonium persulfate and oil-soluble initiators such as azo compounds represented by azobisisobutyronitrile, lauroyl peroxide, and t-butyl peroxypivalate, diacyl peroxides, peroxyesters, and peroxydicarbonates. These initiators can be used alone or in any desired combination of two or more thereof.

The aqueous medium to be used in the invention is a medium which includes water and a water-soluble polymerization aid (e.g., a buffer) and in which organic layers including a vinyl chloride monomer are to be dispersed.

Although the aqueous medium contains no surfactant, examples of surfactants are the same as those enumerated above.

(Heat-Insulating Layer)

The heat-insulating layer serves to protect the support against the heat generated during thermal transfer using a thermal head. Furthermore, since the heat-insulating layer has high cushioning properties, a thermal transfer image-receiving sheet having high printing sensitivity can be obtained even when paper was used as the base. Examples of the heat-insulating layer include a layer that contains polymer particles each having air, which has a low coefficient of thermal conductivity, encapsulated therein and a layer that contains hollow polymer particles.

The heat-insulating layer can contain a hollow-polymer latex or a water-soluble polymer. Hollow-polymer latexes are on the market, and examples thereof include Nipol (registered trademark) MH5055, manufactured by Nippon Zeon Co., Ltd., and F-30, manufactured by Matsumoto Yushi-Seiyaku Co., Ltd. The water-soluble polymer preferably is any of the water-soluble polymers shown above with regard to the receiving layer.

(Undercoat Layer)

The undercoat layer is formed in order to regulate the gloss, antistatic properties, etc. of the thermal transfer image-receiving sheet. Examples of the undercoat layer include a layer for white-background regulation, a layer for regulating static buildup, an adhesion layer, and a primer layer.

(Support)

Examples of the support include water-resistant supports and electrically conductive supports. However, water-resistant supports are preferred. By using a water-resistant support, the support is prevented from absorbing water and the receiving layer can be prevented from changing in performance with the lapse of time. Examples of the water-resistant support include coated papers and laminated papers. A coated paper is a paper obtained by coating one or each surface of a sheet such as raw paper with any of various resins, rubber latexes, and polymeric materials. The amount of the coating varies depending on applications.

(Thermal Transfer Sheet)

The thermal transfer sheet (ink sheet), which is used during thermal transfer imaging in combination with the thermal transfer image-receiving sheet of the invention described above, includes a support and, disposed thereon, a colorant layer which contains a diffusion transfer dye. Any desired ink sheet can be used. As a means for imparting heat energy during thermal transfer, any of the conventionally known impartation means can be used. For example, a heat energy of about 5-100 mJ/mm$^2$ is imparted by controlling recording period by means of a recording device, e.g., a thermal printer, thereby enabling the desired purpose to be sufficiently accomplished. The thermal transfer image-receiving sheet of the invention can be rendered usable in various applications, such as sheet- or roll-form thermal transfer image-receiving sheets, cards, transparent-copy preparation sheets, and the like which are capable of thermal transfer recording, by suitably selecting the support.

The thermal transfer image-receiving sheet of the invention can be used in printers, copiers, and the like in which a thermal transfer recording technique is utilized.

EXAMPLES

The invention will be explained below in more detail by reference to Examples, but the invention should not be construed as being limited to the following Examples.

Example 1

Into a 2.5-L autoclave were introduced 600 g of deionized water, 438.8 g of a vinyl chloride monomer (97.5% by weight based on all monomers fed), and 2.25 g of potassium persulfate. This reaction mixture was stirred with a stirrer so as to maintain a rotation speed of 120 rpm, and the temperature of the reaction mixture was elevated to 60° C. to initiate polymerization. Over the 4-hour period from initiation of the polymerization, 11.2 g of glycidyl methacrylate (2.5% by weight based on all monomers fed) was continuously added at 2.8 g/hr. At the time when the polymerization pressure had decreased by 0.6 MPa from the saturated vapor pressure at 60° C. of the vinyl chloride monomer, the polymerization was terminated. Thus, a vinyl chloride-based resin latex was obtained. This vinyl chloride-based resin latex was evaluated for solid concentration, average particle diameter, amount of scale generated, and latex frothing by the following examination methods. The results of the evaluation are shown in Table 1.

TABLE 1

| Example | | 1 | 2 | 3 | 4 | 5 |
|---|---|---|---|---|---|---|
| Monomer | VCM (wt %) | 97.5 | 99.7 | 97.5 | 97.5 | 97.5 |
| | Others (wt %) | GMA 2.5 | GMA 0.3 | GMA 2.5 | AGE 2.5 | GMA 1.25 |
| | | | | | | AGE 1.25 |
| Others | | — | — | — | — | — |
| Average particle diameter (nm) | | 450 | 500 | 400 | 450 | 450 |
| Solid concentration (wt %) | | 42 | 42 | 41 | 42 | 42 |
| Amount of scale generated (wt %) | | 0.6 | 0.7 | 0.8 | 1.5 | 1.0 |
| Frothing of latex | | A | A | A | A | A |

* VCM: vinyl chloride monomer
GMA: glycidyl methacrylate
AGE: allyl glycidyl ether Twenty grams of dioctyl phthalate, which is a plasticizer, was added to 100 g of the vinyl chloride-based resin latex obtained, thereby obtaining a vinyl chloride-based resin latex composition.

Using a spray dryer having a rotating disk with a diameter of 12 cm, the vinyl chloride-based resin latex obtained was spray-dried under the conditions of a drying-air inlet temperature of 158° C., a drying-air outlet temperature of 55° C., and a rotation speed of 12,000 rpm to thereby obtain a vinyl chloride-based resin powder. The vinyl chloride-based resin powder obtained was examined for average particle diameter by the following examination method. As a result, the average particle diameter thereof was found to be 20 μm.

Eighty grams of methyl ethyl ketone was added to 20 g of the vinyl chloride-based resin powder obtained. As a result, the powder dissolved, and a vinyl chloride-based resin composition was obtained.

<Determination of Solid Concentration>

Five grams of the latex was placed on an aluminum plate, and the weight was measured. Subsequently, the latex was dried in a 40° C. dryer for 24 hours to vaporize the water. Thereafter, the weight of the dried residue was measured, and the solid concentration was calculated from the resultant weight ratio.

<Average Particle Diameter>

The concentration of the vinyl chloride-based resin latex or vinyl chloride-based resin powder was regulated by adding water thereto so as to result in a laser light transmittance of 75-85%. The test sample thus prepared was examined for median diameter using a laser diffraction/scattering type particle size analyzer (trade name, LA-920; manufactured by Horiba Ltd.), and the median diameter was taken as the average particle diameter.

<Amount of Scale Generated>

The resinous deposit which was adherent to the wall surface of the 2.5-L autoclave and to the stirring blades and resinous matter collected by filtering the obtained latex through a 60-mesh metal gauze were dried in a 40° C. dryer for 72 hr to vaporize the water. Thereafter, the weight of the dried matter was measured. The proportion of this weight to the weight of the monomers which had been fed to the autoclave was determined in terms of percentage and taken as the amount of scale generated.

<Frothing of Latex>

The latex was charged into a 1-L vacuum-resistant glass vessel. The latex was heated to 60° C., and the internal pressure of the vacuum-resistant glass vessel was reduced with a vacuum pump while stirring the latex at a rotation speed of 120 rpm. At the time when the degree of vacuum became −60 kPa, the latex was visually examined for frothing and was evaluated based on the following criteria.

A: Latex frothed slightly.
B: Latex frothed considerably.

Example 2

A vinyl chloride-based resin latex was obtained in the same manner as in Example 1, except that the vinyl chloride monomer and glycidyl methacrylate in Example 1 were replaced respectively with 448.6 g of a vinyl chloride monomer (99.7% by weight based on all monomers fed) and 1.4 g of glycidyl methacrylate (0.3% by weight based on all monomers fed) and that continuous addition was conducted at 0.7 g/hr over the 2-hour period from initiation of the polymerization. This latex was evaluated in the same manners as in Example 1. The results of the evaluation are shown in Table 1.

Example 3

A vinyl chloride-based resin latex was obtained in the same manner as in Example 1, except that 2.2 g of the glycidyl methacrylate in Example 1 (0.5% by weight based on all monomers fed) was introduced into a 2.5-L autoclave before initiation of polymerization and the remainder, i.e., 9.0 g, of the glycidyl methacrylate (2.0% by weight based on all monomers fed) was continuously added at 3.0 g/hr over the 3-hour period from initiation of the polymerization. This latex was evaluated in the same manners. The results of the evaluation are shown in Table 1.

Example 4

A vinyl chloride-based resin latex was obtained in the same manner as in Example 1, except that the glycidyl methacrylate in Example 1 was replaced with allyl glycidyl ether. This latex was evaluated in the same manners. The results of the evaluation are shown in Table 1.

Example 5

A vinyl chloride-based resin latex was obtained in the same manner as in Example 1, except that the glycidyl methacrylate in Example 1 was replaced with 5.6 g of glycidyl methacrylate (1.25% by weight based on all monomers fed) and 5.6 g of allyl glycidyl ether (1.25% by weight based on all monomers fed), and that the monomers consisting of the 5.6 g of glycidyl methacrylate and the 5.6 g of allyl glycidyl ether were continuously added at 2.8 g/hr over the 4-hour period from initiation of the polymerization. This latex was evaluated in the same manners. The results of the evaluation are shown in Table 1.

Example 6

A vinyl chloride-based resin latex was obtained in the same manner as in Example 1, except that the vinyl chloride monomer in Example 1 was replaced with 393.8 g of a vinyl chloride monomer (87.5% by weight based on all monomers fed) and 45 g of vinyl acetate (10% by weight based on all monomers fed). This latex was evaluated in the same manners. The results of the evaluation are shown in Table 2.

TABLE 2

| Example | | 6 | 7 | 8 | 9 | 10 |
|---|---|---|---|---|---|---|
| Monomer | VCM (wt %) | 87.5 | 87.5 | 97.5 | 97.5 | 97.5 |
| | Others (wt %) | GMA 2.5 | GMA 2.5 | GMA 2.5 | GMA 2.5 | GMA 2.5 |
| | | VAc 10 | VAc 10 | — | — | — |
| Others | | — | — | OMP 0.9 g | L-ascorbic acid 0.1 g | L-ascorbic acid 0.1 g OMP 0.9 g |
| Average particle diameter (nm) | | 400 | 420 | 450 | 400 | 450 |
| Solid concentration (wt %) | | 42 | 42 | 41 | 42 | 43 |
| Amount of scale generated (wt %) | | 0.9 | 1.3 | 0.4 | 0.4 | 0.2 |
| Frothing of latex | | A | A | A | A | A |

*VCM: vinyl chloride monomer
GMA: glycidyl methacrylate
VAc: vinyl acetate
OMP: octyl 3-mercaptopropionate Example 7

A vinyl chloride-based resin latex was obtained in the same manner as in Example 6, except for the following. Into a 2.5-L autoclave were introduced 180 g of a vinyl chloride monomer (40% by weight based on all monomers fed) and 45 g of vinyl acetate (10% by weight based on all monomers fed). Polymerization was initiated. At the time when the polymerization pressure had decreased by 0.1 MPa from the saturated vapor pressure at 60° C. of the vinyl chloride monomer, the remainder of vinyl chloride monomer, which amounted to 213.8 g (47.5% by weight based on all monomers fed), was introduced into the 2.5-L autoclave to continue the polymerization. At the time when the polymerization pressure had decreased by 0.6 MPa from the saturated vapor pressure at 60° C. of the vinyl chloride monomer, the polymerization was terminated. This latex was evaluated in the same manners. The results of the evaluation are shown in Table 2. The period from the initiation to the termination of the polymerization was shorter by 60 minutes than in Example 6.

Example 8

A vinyl chloride-based resin latex was obtained in the same manner as in Example 1, except that 0.9 g of octyl 3-mercaptopropionate was introduced as a chain transfer agent into the 2.5-L autoclave. This latex was evaluated in the same manners. The results of the evaluation are shown in Table 2.

Example 9

A vinyl chloride-based resin latex was obtained in the same manner as in Example 1, except that the amount of the potassium persulfate in Example 1 was changed to 0.7 g and that 25 g of a 0.4% by weight aqueous solution of L-ascorbic acid was continuously introduced as a reducing agent into the 2.5-L autoclave during the period from the time when 240 minutes had passed since initiation of the polymerization to termination of the polymerization. This latex was evaluated in the same manners. The results of the evaluation are shown in Table 2.

Example 10

A vinyl chloride-based resin latex was obtained in the same manner as in Example 9, except that 0.9 g of octyl 3-mercaptopropionate was introduced as a chain transfer agent into the 2.5-L autoclave. This latex was evaluated in the same manners. The results of the evaluation are shown in Table 2.

Comparative Example 1

Polymerization was conducted in the same manner as in Example 1, except that the vinyl chloride monomer in Example 1 was replaced with 450 g of a vinyl chloride monomer and that the feeding of glycidyl methacrylate was omitted. As a result, the reaction mixture coagulated in the course of the polymerization and no latex was obtained.

Comparative Example 2

A vinyl chloride-based resin latex was obtained by conducting polymerization in the same manner as in Comparative Example 1, except that 180 g of a 5% by weight aqueous solution of sodium dodecylbenzenesulfonate (2% by weight based on all monomer fed) was introduced into the 2.5-L autoclave to initiate polymerization. This latex was evaluated in the same manners. The results of the evaluation are shown in Table 3. It was observed that the latex frothed considerably.

Comparative Example 3

A vinyl chloride-based resin latex was obtained in the same manner as in Example 1, except that the vinyl chloride monomer in Example 1 was replaced with 120 g of a vinyl chloride monomer, that the feeding of glycidyl methacrylate was omitted, and that the amount of the potassium persulfate to be introduced was changed to 0.60 g. This latex was evaluated in the same manners. The results of the evaluation are shown in Table 3. The latex frothed only slightly but scale generation occurred.

Comparative Example 4

A vinyl chloride-based resin latex was obtained in the same manner as in Example 1, except that the vinyl chloride monomer in Example 1 was replaced with 240 g of a vinyl chloride monomer, that the feeding of glycidyl methacrylate was omitted, and that the amount of the potassium persulfate to be introduced was changed to 1.20 g. This latex was evaluated in the same manners. The results of the evaluation are shown in Table 3. The latex frothed only slightly but scale generation occurred.

Comparative Example 5

Polymerization was conducted in the same manner as in Example 1, except that the 11.2 g of glycidyl methacrylate in Example 1 (2.5% by weight based on all monomers fed) was introduced into the 2.5-L autoclave to initiate the polymerization. As a result, the reaction mixture coagulated in the course of the polymerization and no latex was obtained.

Comparative Example 6

Polymerization was conducted in the same manner as in Example 1, except that the vinyl chloride monomer in Example 1 was replaced with 449.7 g of a vinyl chloride monomer (99.95% by weight based on all monomers fed), that the glycidyl methacrylate was replaced with 0.3 g of glycidyl methacrylate (0.05% by weight based on all monomers fed), and that the glycidyl methacrylate was continuously added at 0.3 g/hr over the 1-hour period from initiation of the polymerization. As a result, the reaction mixture coagulated in the course of the polymerization and no latex was obtained.

Comparative Example 7

Polymerization was conducted in the same manner as in Example 1, except that the glycidyl methacrylate in Example 1 was replaced with vinyl acetate. As a result, the reaction mixture coagulated in the course of the polymerization and no latex was obtained.

TABLE 3

| Comparative Example | 1 | 2 | 3 | 4 | 5 | 6 | 7 | 8 | 9 |
|---|---|---|---|---|---|---|---|---|---|
| Monomer VCM (wt %) | 100 | 100 | 100 | 100 | 97.5 | 99.95 | 97.5 | 97.5 | 97.5 |
| Others (wt %) | — | — | — | — | GMA 2.5 | GMA 0.05 | — | — | — |
|  | — | — | — | — | — | — | VAc 2.5 | 2-HEMA 2.5 | 2-HPMA 2.5 |
| DBS (wt %) | — | 2 | — | — | — | — | — | — | — |
| Average particle diameter (nm) | — | 150 | 530 | 620 | — | 130 | — | — | — |
| Solid concentration (wt %) | — | 35 | 7 | 20 | — | 42 | — | — | — |
| Amount of scale generated (wt %) | coagulated | 0.6 | 20 | 25 | coagulated | coagulated | coagulated | coagulated | coagulated |
| Frothing of latex | — | B | A | A | — | — | — | — | — |

* VCM: vinyl chloride monomer
GMA: glycidyl methacrylate
AGE: allyl glycidyl ether
VAc: vinyl acetate
2-HEMA: 2-hydroxyethyl methacrylate
2-HPMA: 2-hydroxypropyl methacrylate
DBS: sodium dodecylbenzenesulfonate

Comparative Example 8

Polymerization was conducted in the same manner as in Example 1, except that the glycidyl methacrylate in Example 1 was replaced with 2-hydroxyethyl methacrylate. As a result, the reaction mixture coagulated in the course of the polymerization and no latex was obtained.

Comparative Example 9

Polymerization was conducted in the same manner as in Example 1, except that the glycidyl methacrylate in Example 1 was replaced with 2-hydroxypropyl methacrylate. As a result, the reaction mixture coagulated in the course of the polymerization and no latex was obtained.

Example 11

A thermal transfer image-receiving sheet 1 was produced by the following method and evaluated by the following evaluation methods. The results thereof are shown in Table 4. The thermal transfer image-receiving sheet 1 had satisfactory water resistance, did not yellow during storage, and gave images having satisfactory durability and light resistance.

TABLE 4

|  | Example 11 | Example 12 | Comparative Example 10 | Comparative Example 11 |
|---|---|---|---|---|
| Water resistance of unprinted sheet | A | A | C | C |
| Storage yellowing of unprinted sheet | B | B | B | C |
| Durability of image | A | B | B | B |
| Light resistance of image | A | B | B | C |

<Production of Support>

A support for constituting the thermal transfer image-receiving sheet was produced in the following manner.

Namely, 50% by weight LBKP (hardwood bleached kraft pulp) obtained from acacia and 50% by weight LBKP obtained from aspen each were beaten to a Canadian freeness of 300 mL by means of a disk refiner to prepare a pulp slurry. Subsequently, to the pulp slurry obtained above were added 1.3% by weight cation-modified starch (CAT 0304L, manufactured by Nippon NSC Co.), 0.15% by weight anionic polyacrylamide (DA 41404, manufactured by Seiko PMC Corp.), 0.29% by weight alkylketene dimer (Sizebine K, manufactured by Arakawa Chemical Industries, Ltd.), 0.29% by weight epoxidized behenamide, and 0.32% by weight polyamide-polyamine epichlorohydrin (Arafix 100, manufactured by Arakawa Chemical Industries, Ltd.), based on the pulps. Thereafter, 0.12% by weight antifoamer was added.

The pulp slurry thus prepared was formed into a sheet with a long-wire paper machine. In a step in which the felt-side surface of the web was pushed against the drum dryer cylinders through a dryer canvas, drying was conducted at a dryer canvas tensile force set at 1.6 kg/cm. Thereafter, poly(vinyl alcohol) (KL-118, manufactured by Kuraray Co., Ltd.) was applied in an amount of 1 g/m² to each surface of the base paper by means of a sizing press, and the coated paper was dried and calendered. Thus, a support was produced.

<Production of Thermal Transfer Image-receiving Sheet 1>

A multilayer coating configured of an undercoat layer, a heat-insulating layer, and a receiving layer in this order from the lowermost layer was formed by simultaneous multiple coating on the support produced by the method described above. The composition and application amount of each coating fluid used for producing the thermal transfer image-receiving sheet 1 are shown below.

(Coating Fluid for Undercoat Layer Formation)

A mixture of 93% by weight styrene/butadiene latex (SR103, manufactured by NIPPON A&L Inc.) and 57% by weight 8.7% aqueous PVA solution was regulated to pH 8 with an aqueous NaOH solution to obtain a coating fluid for undercoat layer formation. This coating fluid was applied so as to form an undercoat layer in an amount of 21 mL/m².

(Coating Fluid for Heat-insulating Layer Formation)

A mixture of 38% by weight hollow-polymer latex (Nipol (registered trademark) MH5055, manufactured by Nippon Zeon Co., Ltd.), 26% by weight 16% aqueous gelatin solution, and 4% by weight water was regulated to pH 8 with an aqueous NaOH solution to obtain a coating fluid for heat-insulating layer formation. This coating fluid was applied so as to form a heat-insulating layer in an amount of 45 mL/m².

(Coating Fluid for Receiving Layer Formation)

A mixture of 50% by weight the vinyl chloride-based resin latex produced in Example 1 (latex 1), 10% by weight 10% aqueous gelatin solution, 7% by weight microcrystalline wax (EMUSTAR 42X, manufactured by Nippon Seiro Co., Ltd.), and 35% by weight water was regulated to pH 8 with an aqueous NaOH solution to obtain a coating fluid for receiving layer formation. This coating fluid was applied so as to form a receiving layer in an amount of 18 mL/m² (content of the epoxy-group-containing vinyl in the receiving layer; 2.5 parts by weight per 100 parts by weight of the vinyl chloride-based resin).

<Evaluation Methods>

(Water Resistance Test of Unprinted Sheet)

A drop of tap water was dropped at ordinary temperature onto each of both side-edge parts of the receiving layer of the image-receiving sheet obtained. At 10 seconds thereafter, the areas were rubbed with a finger 10 times. The areas were visually evaluated for trace of rubbing.

A: The sheet has no trace of rubbing, and practical use thereof is not problematic at all.

B: The sheet bears a slight trace of rubbing but is practically usable.

C: The sheet bears a clear trace of rubbing and is unsuitable for practical use.

(Storage Yellowing Test of Unprinted Sheet)

The unprinted image-receiving sheet obtained was placed in a 40° C. 85% RH environment for 3 days. The density of the unprinted sheet after the test was measured with a Macbeth reflection densitometer (trade name, RD-914) using a yellow filter, and the yellowing was evaluated based on the following criteria.

A: The unprinted sheet has a density of less than 0.07, and practical use thereof is not problematic at all.

B: The unprinted sheet has a density of 0.07 or higher but less than 0.12 and is practically usable.

C: The unprinted sheet has a density of 0.12 or higher and is unsuitable for practical use.

(Durability Test of Image)

Using a thermal transfer printer (P-330, manufactured by Olympus Co., Ltd.), ink sheets obtained by forming ink layers respectively containing sublimable dyes of three colors, i.e., yellow, magenta, and cyan, together with a binder on polyester films having a thickness of 6 μm were successively brought into contact with the thermal transfer image-receiving sheet, and the ink sheets and the image-receiving sheet were subjected to stage-wise controlled heating by means of the thermal head to thereby produce a black gradation image.

An area corresponding to a color density of 0.3 was selected from the resultant black gradation image using a Macbeth reflection densitometer (trade name, RD-914). A finger was forcibly pushed against the surface of the image area, which was thereafter allowed to stand in a 40° C. environment for 24 hours and then visually evaluated for finger mark.

A: The image bears no finger mark at all, and practical use of the printed matter is not problematic at all.

B: The image bears a slight finger mark, but the printed matter is practically usable.

C: The image bears a clear finger mark, and the printed matter is unsuitable for practical use.

(Light Resistance Test of Image)

Using a thermal transfer printer (P-330, manufactured by Olympus Co., Ltd.), ink sheets obtained by forming ink layers respectively containing sublimable dyes of three colors, i.e., yellow, magenta, and cyan, together with a binder on polyester films having a thickness of 6 µm were successively brought into contact with the thermal transfer image-receiving sheet and the ink sheets and the image-receiving sheet were subjected to stage-wise controlled heating by means of the thermal head to thereby produce a black solid image.

The resultant printed matter having a black solid image was treated with a Xe fadeometer until the integrated irradiance reached 10,000 kJ/m$^2$.

The color tone of the image was measured before and after the light resistance test using a color-difference meter (Gretag AG) in accordance with JIS Z 8721. The measured values were recorded in terms of the L*a*b* color system in accordance with JIS Z 8729, and the color difference ($\Delta E^*$) between before and after the treatment was calculated by the method according to JIS Z 8730 to evaluate the light resistance.

A: $\Delta E^*$ is less than 8, and practical use of the printed matter is not problematic at all.

B: $\Delta E^*$ is 8 or more but less than 13, and practical use of the printed matter is not problematic at all.

C: $\Delta E^*$ is 13 or more, and the printed matter is not suitable for practical use.

Example 12

A thermal transfer image-receiving sheet 2 was produced by the following method and evaluated by the evaluation methods described above. The results thereof are shown in Table 4. As in Example 11, this image-receiving sheet had satisfactory water resistance, did not yellow during storage, and gave images having satisfactory durability and light resistance.

<Production of Thermal Transfer Image-receiving Sheet 2>

A thermal transfer image-receiving sheet 2 was produced in the same manner as for the thermal transfer image-receiving sheet 1, except that the latex 1 used for forming the receiving layer of the thermal transfer image-receiving sheet 1 was replaced with the vinyl chloride-based resin latex produced in Example 6 (latex 2) (content of the epoxy-group-containing vinyl in the receiving layer; 2.5 parts by weight per 100 parts by weight of the vinyl chloride-based resin).

Comparative Example 10

A thermal transfer image-receiving sheet 3 was produced by the following method and evaluated by the evaluation methods described above. The results thereof are shown in Table 4.

<Synthesis of Vinyl Chloride-based Resin Latex>

A vinyl chloride-based resin latex (latex 3) was obtained in the same manner as in Example 1, except that 180 g of 5% by weight aqueous ammonium laurate (anionic surfactant) solution (2% by weight based on all monomers fed) was continuously introduced at 40 g/hr over the period from the time when 90 minutes had passed since initiation of the polymerization to the time when 360 minutes had passed since the polymerization initiation, and that the amount of the deionized water in Example 1 was changed to 420 g. The vinyl chloride-based resin in the latex 3 had an average particle diameter of 0.4 µm (400 nm).

<Production of Thermal Transfer Image-receiving Sheet 3>

A thermal transfer image-receiving sheet 3 was produced in the same manner as for the thermal transfer image-receiving sheet 1, except that the latex 1 used for forming the receiving layer of the thermal transfer image-receiving sheet 1 was replaced with the latex 3 (content of the epoxy-group-containing vinyl in the receiving layer; 2.5 parts by weight per 100 parts by weight of the vinyl chloride-based resin).

Comparative Example 11

A thermal transfer image-receiving sheet 4 was produced by the following method and evaluated by the evaluation methods described above. The results thereof are shown in Table 4.

<Synthesis of Vinyl Chloride-based Resin Latex>

A vinyl chloride-based resin latex (latex 4) was obtained in the same manner as in Example 6, except that 180 g of 5% by weight aqueous ammonium laurate (anionic surfactant) solution (2% by weight based on all monomers fed) was continuously introduced at 40 g/hr over the period from the time when 90 minutes had passed since initiation of the polymerization to the time when 360 minutes had passed since the polymerization initiation, and that the amount of the deionized water in Example 6 was changed to 420 g. The vinyl chloride-based resin in the latex 4 had an average particle diameter of 0.35 µm (350 nm).

<Production of Thermal Transfer Image-receiving Sheet 4>

A thermal transfer image-receiving sheet 4 was produced in the same manner as for the thermal transfer image-receiving sheet 1, except that the latex 1 used for forming the receiving layer of the thermal transfer image-receiving sheet 1 was replaced with the latex 4 (content of the epoxy-group-containing vinyl in the receiving layer; 2.5 parts by weight per 100 parts by weight of the vinyl chloride-based resin).

While the invention has been described in detail and with reference to specific embodiments thereof, it will be apparent to one skilled in the art that various changes and modifications can be made therein without departing from the spirit and scope thereof.

This application is based on a Japanese patent application filed on Dec. 10, 2009 (Application No. 2009-280712) and a Japanese patent application filed on Dec. 16, 2009 (Application No. 2009-285463), the contents thereof being incorporated herein by reference.

Industrial Applicability

The vinyl chloride-based resin latexes of the invention have an advantage that since the latexes contain no surfactant, the latexes are inhibited from frothing when unreacted monomers are recovered from the latexes, thereby enabling the recovery step to be conducted efficiently. The thermal transfer image-receiving sheet of the invention has an advantage that the image receiving sheet has satisfactory water resistance,

The invention claimed is:

1. A vinyl chloride-based resin latex, comprising a copolymer comprising vinyl chloride and an epoxy-group-comprising vinyl,
wherein:
a content of the epoxy-group-comprising vinyl in the copolymer is 0.1% by weight or more but less than 3% by weight;
the resin latex comprises no surfactant and has a solid concentration of 25% by weight or more; and
the vinyl chloride-based resin latex is produced by a process comprising:
polymerizing a vinyl chloride monomer and an epoxy-group-comprising vinyl monomer in the presence of a polymerization initiator in an aqueous medium comprising water and no surfactant, wherein an amount of the epoxy-group-comprising vinyl monomer is 0.1% by weight or more but less than 3% by weight, based on a sum of the vinyl chloride monomer and the epoxy-group-comprising vinyl monomer,
wherein a weight ratio of the vinyl chloride monomer and the epoxy-group-comprising vinyl monomer to the water is ⅓ or greater and that part or the whole of the epoxy-group-comprising vinyl monomer is added in portions or continuously to the aqueous medium during the polymerization.

2. The resin latex of claim 1, wherein the epoxy-group-comprising vinyl is glycidyl methacrylate or allyl glycidyl ether.

3. A process for producing the vinyl chloride-based resin latex of claim 1, the process comprising:
polymerizing a vinyl chloride monomer and an epoxy-group-comprising vinyl monomer in the presence of a polymerization initiator in an aqueous medium comprising water and no surfactant, wherein an amount of the epoxy-group-comprising vinyl monomer is 0.1% by weight or more but less than 3% by weight, based on a sum of the vinyl chloride monomer and the epoxy-group-comprising vinyl monomer,
wherein a weight ratio of the vinyl chloride monomer and the epoxy-group-comprising vinyl monomer to the water is ⅓ or greater and that part or the whole of the epoxy-group-comprising vinyl monomer is added in portions or continuously to the aqueous medium during the polymerization.

4. The process of claim 3, wherein a part of the vinyl chloride monomer is added in portions or continuously to the aqueous medium during the polymerization.

5. The process of claim 3, wherein the monomers are polymerized in the presence of at least one selected from the group consisting of a chain transfer agent and a reducing agent.

6. A vinyl chloride-based resin latex composition, comprising the vinyl chloride-based resin latex of claim 1.

7. A vinyl chloride-based resin powder obtained by drying the vinyl chloride-based resin latex of claim 1.

8. A vinyl chloride-based resin composition, comprising:
the vinyl chloride-based resin powder of claim 7; and
an organic solvent.

9. A vinyl chloride-based resin latex, comprising
a copolymer comprising vinyl chloride, an epoxy-group-comprising vinyl, and a carboxylic acid vinyl ester,
wherein:
a content of the epoxy-group-comprising vinyl in the copolymer is 0.1% by weight or more but less than 3% by weight;
the resin latex comprises no surfactant and has a solid concentration of 25% by weight or more; and
the vinyl chloride-based resin latex is produced by a process comprising:
polymerizing a vinyl chloride monomer, an epoxy-group-comprising vinyl monomer, and a carboxylic acid vinyl ester monomer in the presence of a polymerization initiator in an aqueous medium comprising water and no surfactant, wherein an amount of the epoxy-group-comprising vinyl monomer is 0.1% by weight or more but less than 3% by weight, based on the sum of the vinyl chloride monomer, the epoxy-group-comprising vinyl monomer, and the carboxylic acid vinyl ester monomer,
wherein a weight ratio of the vinyl chloride monomer, the epoxy-group-comprising vinyl monomer, and the carboxylic acid vinyl ester monomer to the water is ⅓ or greater and that part or the whole of the epoxy-group-comprising vinyl monomer is added in portions or continuously to the aqueous medium during the polymerization.

10. The resin latex of claim 9, wherein the carboxylic acid vinyl ester is vinyl acetate.

11. The resin latex of claim 10, wherein the epoxy-group-comprising vinyl is glycidyl methacrylate or allyl glycidyl ether.

12. A process for producing the vinyl chloride-based resin latex of claim 9, the process comprising:
polymerizing a vinyl chloride monomer, an epoxy-group-comprising vinyl monomer, and a carboxylic acid vinyl ester monomer in the presence of a polymerization initiator in an aqueous medium comprising water and no surfactant, wherein an amount of the epoxy-group-comprising vinyl monomer is 0.1% by weight or more but less than 3% by weight, based on the sum of the vinyl chloride monomer, the epoxy-group-comprising vinyl monomer, and the carboxylic acid vinyl ester monomer,
wherein a weight ratio of the vinyl chloride monomer, the epoxy-group-comprising vinyl monomer, and the carboxylic acid vinyl ester monomer to the water is ⅓ or greater and that part or the whole of the epoxy-group-comprising vinyl monomer is added in portions or continuously to the aqueous medium during the polymerization.

13. The process of claim 12, wherein a part of the vinyl chloride monomer is added in portions or continuously to the aqueous medium during the polymerization.

14. The process of claim 12, wherein the monomers are polymerized in the presence of a chain transfer agent, a reducing agent, or a chain transfer agent and a reducing agent.

15. The resin latex of claim 9, wherein the epoxy-group-comprising vinyl is glycidyl methacrylate or allyl glycidyl ether.

16. A vinyl chloride-based resin latex composition, comprising the vinyl chloride-based resin latex of claim 9.

17. A vinyl chloride-based resin powder obtained by drying the vinyl chloride-based resin latex of claim 9.

* * * * *